United States Patent Office 2,871,962
Patented Feb. 3, 1959

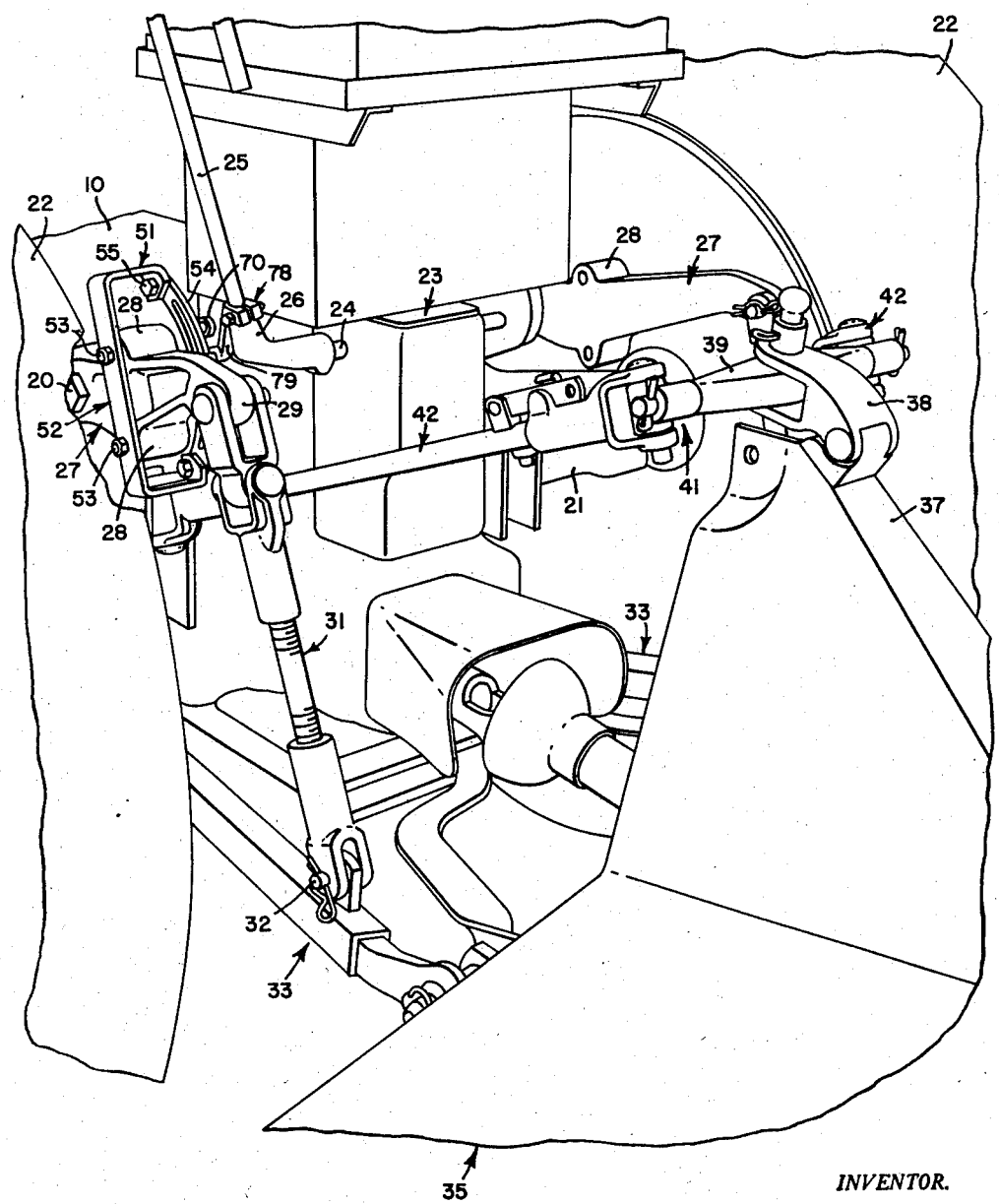

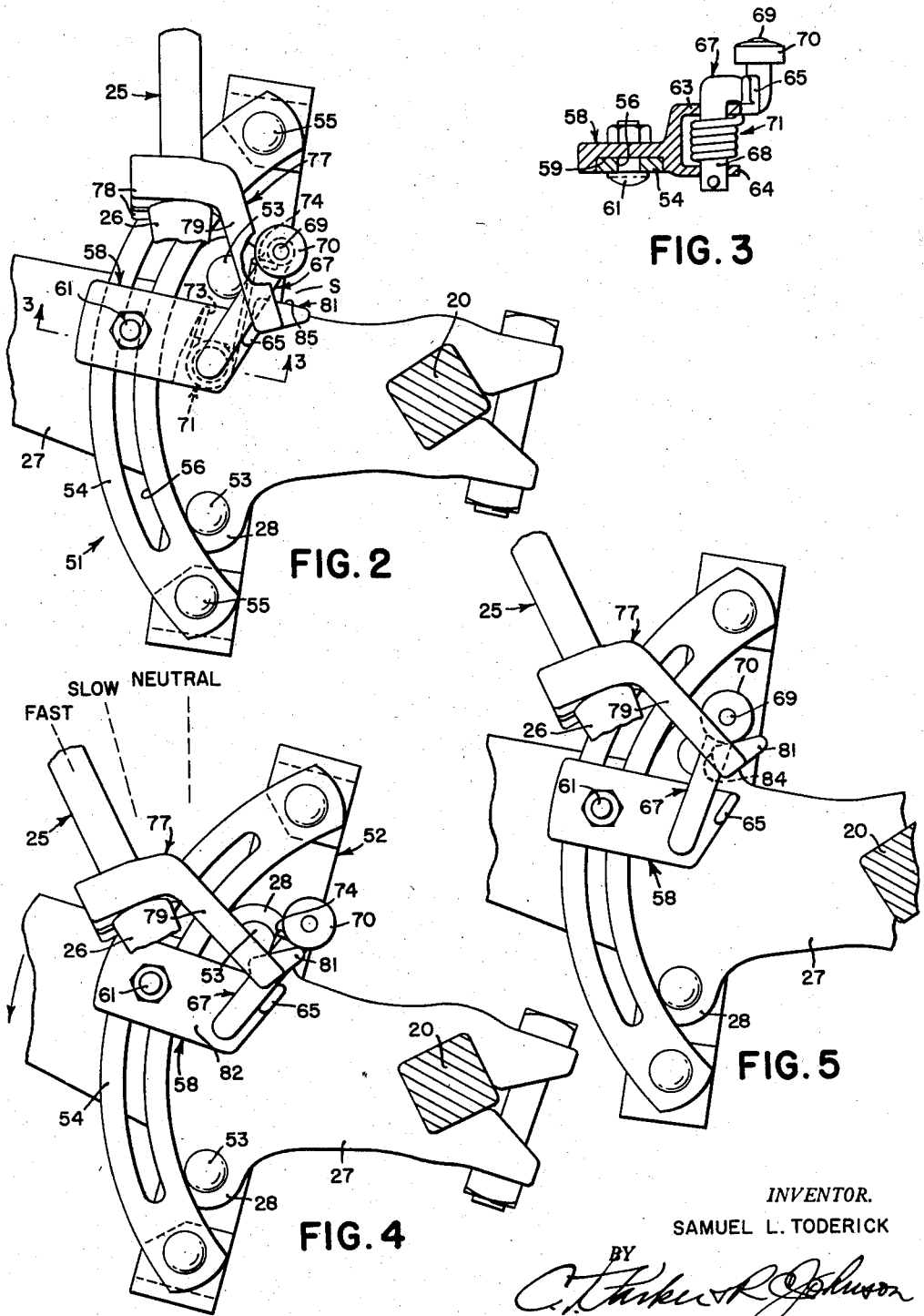

2,871,962

STOP MECHANISM FOR POWER LIFT

Samuel L. Toderick, Welland, Ontario, Canada, assignor to John Deere Plow Company (Limited), Winnipeg, Manitoba, Canada, a corporation of Canada Application October 3, 1955, Serial No. 538,222

7 Claims. (Cl. 172—465)

The present invention relates generally to agricultural implements and more particularly to implements of the type that are raised and lowered and are controlled by hydraulic power actuated mechanism carried by or forming a part of the tractor upon which the implement is mounted or by which it is propelled.

The object and general nature of the present invention is the provision of new and improved means for automatically terminating the movement of the implement in a given or selected position, such as, for example, a predetermined depth of operation, with means making it possible for the operator to override the automatic control and, as a more or less temporary measure, moving the implement beyond the position selected without in any way affecting or losing the selected adjustment which is available at any time subsequent to the temporary manual override.

More specifically, it is a feature of this invention to provide cooperating depth stop means, one on the power lift control lever of the tractor and the other on the implement lift lever of the tractor whereby movement of the latter to a given position automatically returns the valve lever to a neutral position, the depth stop mechanism being so constructed and arranged that the valve lever may, when desired, be manually controlled to produce an implement position other than that for which the apparatus is designed to automatically provide.

These and other objects and advantages of the present invention will be apparent to those skilled in the art after a consideration of the following detailed description, taken in conjunction with the accompanying drawings.

In the drawings:

Fig. 1 is a perspective view showing a tractor and implement combination, in fragmentary form with automatic position-determining means incorporated in the power lift system and hitch structure of the tractor and implement combination.

Fig. 2 is a side view taken along the plane that passes along the side of the tractor, and looking outwardly therefrom.

Fig. 3 is a view taken along the line 3—3 of Fig. 2.

Fig. 4 is a view similar to Fig. 2, showing the valve lever or control element in its fast lowering position, the slow operating and neutral positions of the valve lever being indicated in dotted lines, and the quadrant and spring biased arm being shown in a position just before the arm acts to return the valve lever to neutral position.

Fig. 5 is a view similar to Fig. 2, showing the parts in the position they occupy when the automatic control has been manually overridden.

Referring now to the drawings, particularly Figs. 1 and 2, the tractor-implement organization chosen for the purposes of illustration comprises a farm tractor of generally conventional construction, including a generally centrally arranged frame structure or housing 10 having at its rear portion laterally outwardly extending rear axle housings 21 in which axial shafts are disposed carrying at their outer ends rear traction wheels 22. The tractor also includes power lift structure 23 substantially like that disclosed in U. S. Patent 2,532,552, to which reference may be had if necessary. Such power lift unit 23 includes a valve operating shaft 24 to which a valve operating lever 25 is connected by any suitable means, such as a generally L-shaped arm 26. The power lift mechanism 23 also includes a rockshaft 20 extending transversely of the tractor and projecting therefrom, the rockshaft carrying a lift lever 27 at each end, each lift lever 27 being in the form of a casting having upper and lower apertured bosses 28 and a rear end portion 29 apertured to receive lift links 31, one or both of which may be adjustable by turnbuckle means or the like. The lower end of the lift links 31 is pivotally connected, as at 32, with the associated draft link 33, generally forming a part of the tractor and serving to transmit drive between the tractor and the implement, shown at 35. To illustrate the principles of the present invention, the implement 35 is in the form of a rotary cutter having a generally horizontal rotor-enclosing casing which includes an upwardly extending and forwardly disposed hood 37 having at its upward forward portion a swingable link 38 to which the cross member 39 of upper compression link structure 41 is connected. The link structure 41 preferably includes two generally fore-and-aft extending links 42 each connected at its rear end to the crossbar 39 and its forward end to the tractor at some convenient point, both connections being so constructed and arranged as to provide for both lateral and vertical swinging movement. The structure so far described is generally conventional, so far as the present invention is concerned, and the implement 35 may be raised by moving the valve lever 25 forwardly, which energizes the hydraulic circuits of the mechanism 23 so that the lift arms 27 are swung upwardly, acting through the lift links 31 and the lower draft links 33 to raise the implement. The implement may be lowered by moving the valve lever 25 rearwardly from a neutral position, thus causing the lift arms 27 to be lowered, which provides for lowering of the implement. The lowering of the implement may be terminated at any time by the operator moving the valve lever 25 from a rear position to a forward position.

As reference to the U. S. Patent 2,532,552 will disclose, the operating lever 25 may be moved, either forwardly or rearwardly, from a neutral position into what is termed a slow moving range, in which the lift arms 27 are moved upwardly or downwardly at a relatively slow rate, but if a faster action is desired, the valve lever 25 may be moved, either forwardly or rearwardly, from its slow operating range into a fast operating range, whereby fluid is pumped by the system 23 at a greater effective rate, whereby the implement may be raised or lowered at an increased rate of operation. It is also to be noted that the valve lever 25 and associated parts are so constructed and arranged that the lever 25 will remain in its fast operating position, when moved thereto, but if the valve lever is moved only into a slow operating range, spring means normally will return the valve lever 25, as soon as the operator releases his hold on the lever, to its neutral position. Therefore, in order to return the valve lever 25 from a fast operating position to its neutral position, all that it is necessary to do is to shift the valve lever from its fast operating position into its slow operating position, after which the aforesaid spring means will automatically return the lever to its neutral position, in which hydraulic fluid is locked in the system and the lift arm 27 normally held against downward movement.

Referring now more particularly to Fig. 2 a quadrant structure 51 is mounted on the left hand lift arm 27, which is referred to in some of the broader claims as a work member, since the lift arm 27 performs work in raising and lowering the implement. The quadrant structure 51 comprises a bracket 52 formed with a pair of openings therein to receive bolts 53 that are adapted to extend through the apertured bosses 28 of the work member 27 for the purpose of fixing the bracket 52 rigidly to the associated lift arm 27. The ends of the bracket 52 are shaped to extend laterally inwardly over the associated lift arm with portions turned at right angles and apertured to receive a slotted quadrant or sector 54, the ends of which are apertured to receive bolts 55 that secure the sector 54 to the bracket 52. The slot in the member 54 is indicated at 56.

An adjustable member or slide 58 is disposed on the quadrant or sector 54 and has a recessed portion 59 that fits about the quadrant 54, being apertured too receive a clamping member, as in the form of a bolt 61, that adjustably fixes the slide 58 in different positions along the sector or quadrant 54. The member 58 also includes an inner end portion that is bifurcated, forming two sections 63 and 64 spaced apart laterally, one having an extension 65 in the form of a boss that forms a stop or position-determining means for a spring biased arm 67 the inner end 68 of which is rockably mounted in the apertures in the slide extensions 63 and 64. The outer end of the arm 67 is turned at a right angle and extends laterally inwardly relative to the tractor, being reduced, at 69, to receive a roller 70. A spring member 71 is disposed about the inner end of the arm 67 and has one end 73 bearing against an adjacent portion of the slide 58, the other end having a hook section 74 that engages over the outer end of the arm 67, the spring being arranged to yieldingly hold the arm 67 against its stop 65. As will be seen from Fig. 2, the arm 67 and its roller 70 may be shifted generally rearwardly toward the quadrant 54 by any force that exceeds the force exerted by the spring 71.

The spring biased arm 67 and associated roller 70 forms what may be considered as a first depth stop that is adjustably fixed in any one of a number of selected positions on the quadrant 54. Cooperating with the first depth stop is a second abutment or depth stop, indicated by the reference numeral 77, on the control element 25, being detachably connected therewith. The depth stop 77 on the valve lever or control element 25 comprises a split attaching section 78, a leg portion 79 and a cam section or roller-contacting means 81 that lies forwardly of the axis, indicated at 82, about which the valve lever 25 moves. The roller-contacting section 81 has a rounded rear face, shown at 84, and an upper face 85, the cam section 81 being extended laterally outwardly relative to the leg section 79 of the member 77.

The operation of the device of the present invention is substantially as follows.

Assuming that the implement has been transported in a raised or inoperative position, and that the valve lever 25 has been moved to its fast lowering position, to lower the implement into an operating position, the parts will be disposed, one relative to the other, as shown in Fig. 4. The valve lever 25 is shown in this figure, in full lines, in its fast lowering position, and the lift arm 27, carrying the quadrant structure 51, moves downwardly as the implement is lowered, the arm 67 approaching the stop 77 on the valve lever. In the fast lowering position of the latter, the cam element 81 is elevated, and, as shown in Fig. 4, the roller 70 is closely approaching the cam element 81. As the lift arm 27 continues to move downwardly, the roller 70 engages the cam element 81 and, as viewed in Fig. 4, the continued downward movement of the depth stop arm 67 acts to swing the valve lever 25 in a clockwise direction until the valve lever 25 is moved into its slow operating range, at which time the associated spring means then snaps the valve lever into its neutral position, automatically stopping any further lowering movement of the lift arm 27. When this occurs, the parts then occupy the position shown in Fig. 2. From this figure it will be noted that there is a space S between the roller 70 and the cam element 81 on the valve lever depth stop 77. This represents the amount of movement that the spring means of the hydraulic lift mechanism 23 moves the valve lever automatically after the movement of the lift arm has carried the valve lever from its fast operating position into its slow operating position. It will be noted that the point at which the lowering movement of the implement is terminated is determined by the position of the slide 58 on the quadrant or sector 54. For example, if a relatively high, or shallow, operating position is desired, the slide 58 will be moved to a lower position along the sector 54, whereas if a lower operating position is desired, the slide 58 will be adjusted to an upper position along the sector 54.

If for any reason it should be desired, where the implement has already been automatically adjusted or lowerered to its desired position by the above mentioned automatic action, to have the implement lowered still farther, all that it is necessary to do is to move the valve lever 25 to a lowering position. By virtue of the space S mentioned above, the valve lever 25 may be moved in a lowering direction, counterclockwise as viewed in Figs. 4 and 5, until the cam element 81 comes into contact with the roller 70. This provides for a slow lowering movement, and as soon as the operator releases his hold on the valve lever 25, the latter is automatically moved into its neutral position. If, however, a fast lowering action is desired, then the operator manually moves the valve lever 25 into its fast operating position, shown in full lines in Fig. 5 in which it will be noted that the movement of the valve lever from its slow operating position into its fast operating position is made possible by the rearward yielding of the roller arm 67, moving away from the stop 65 against the action of the spring 71. In this manner of securing an additional lowering movement, such lowering movement is terminated by manual movement of the lift arm 25 into or toward its neutral position.

While I have shown and described above the preferred structure in which the principles of the present invention have been incorporated, it is to be understood that the present invention is not to be limitetd to the particular details, shown and described above, but that, in fact, widely different means may be employed in the practice of the broader aspects of my invention.

What I claim, therefore, and desire to secure by Letters Patent is:

1. In a device of the class described, the combination of a power-actuated movable work member, a control element associated therewith and shiftable from a neutral position to effect movement of the work member in a certain direction, said work member and said control element being mounted for movement about parallel axes spaced apart in a generally fore-and-aft extending direction, a quadrant fixed to said work member and disposed adjacent the axis of movement of said control element, a stop on the said element having a portion disposed adjacent said quadrant, and a cooperating depth stop on said quadrant disposed on the latter in a position to engage said first stop and operate said control element, said second stop including yielding means arranged to provide for independent movement of said control element in either direction.

2. In a device of the class described, the combination of a power-actuated movable work member, a control element associated therewith and shiftable from a neutral position to effect movement of the work member in a certain direction, said work member and said control element being mounted for movement about parallel axes spaced apart in a generally fore-and-aft extending direction, a quadrant fixed to said work member and disposed adjacent the axis of movement of said control element, a stop on the said element having a portion disposed adjacent said quadrant, and a cooperating depth stop on said quadrant disposed on the latter in a position to engage said first stop and operate said control element, said depth stop comprising a slide adjustable on said quadrant, a spring biased detent arm pivoted to said slide, and a stop on said slide limiting movement of said detent arm in the direction in which said arm is biased by said spring.

3. The combination with a tractor having a hydraulic power lift unit including a lifting member, a control valve member movable from a neutral position into a slow operating position and a fast operating position for operating said lifting member, resilient means for automatically returning the control member to its neutral position from its slow operating position, and means for releasably holding said control member in its fast operating position, of an implement adapted to be movably connected with the tractor, means for connecting said lifting member with said implement, a resilient abutment member movable with and adjustable on said lifting member for shifting said valve control member from its fast operating position into its neutral position for terminating movement of said implement operating unit, there being sufficient space between said abutment member and the adjacent portion of said valve control member to provide for subsequent movement of said valve control member from its neutral position into its slow operating position, said resilient abutment yielding to provide for movement of said valve control member from its slow operating position into its fast operating position.

4. The combination set forth in claim 3, further characterized by said resilient abutment including a part pivoted to said lifting member, a stop limiting movement of said pivoted part in one direction, and a spring biasing said part for movement against said stop.

5. The combination with a tractor having a hydraulic power lift unit including a lifting member, a control valve member movable from a neutral position selectively into either of two opposite operating positions for raising or lowering said lifting member, resilient means for automatically returning the control member to its neutral position from an operating position, and means for releasably holding said control member in either of its operating positions, of an implement adapted to be movably connected with the tractor, means for connecting said lifting member with said implement, a resilient abutment member movable with and adjustable on said lifting member for shifting said valve control member from either of its operating positions into its neutral position for terminating movement of said implement operating unit, said resilient abutment yielding to provide for movement of said valve control member from its neutral position into either of its operating positions.

6. The combination with a tractor having a hydraulic power lift unit including a work member, and a control member movable from a neutral position for operating said work member, of a pair of stops, one movable with said work member and the other with said control member and said stops being located so that in a predetermined position of the work member one stop is engageable with the other to return the control member to its neutral position, thereby limiting the movement of the work member, and one of said stops including a resiliently biased part pivotally mounted so as to be swingable away from the path of movement of the other stop upon the application of an amount of force on said control member sufficient to overcome the bias of said resiliently biased part.

7. The combination with a tractor having a hydraulic power lift unit including a work member, a control member movable from a neutral position into a slow operating position and a fast operating position for operating said work member, resilient means for automatically returning the control member to its neutral position from its slow operating position, and means for releasably holding said control member in its fast operating position, of an implement adapted to be movably connected with the tractor, means connecting said work member with said implement, an abutment movable with and adjustable on the work member for shifting said control member from its fast operating position into its neutral position for terminating movement of said work member, there being sufficient space between said abutment member and the adjacent portion of said control member to provide for subsequent movement of said control member from its neutral position into its slow operating position, and said abutment including a resiliently biased part movably mounted on the abutment and shiftable so as to accommodate movement of the control member from its slow operating position into its fast operating position so as to provide for an additional movement of the work member.

References Cited in the file of this patent
UNITED STATES PATENTS

| | | |
|---|---|---|
| 1,929,804 | Brown | Oct. 10, 1933 |
| 2,334,137 | Wagner et al. | Nov. 9, 1943 |
| 2,405,334 | Silver | Aug. 6, 1946 |
| 2,532,552 | Jirsa et al. | Dec. 5, 1950 |
| 2,618,167 | Seifert | Nov. 18, 1952 |
| 2,641,172 | Silver | June 9, 1953 |
| 2,700,330 | Starr | Jan. 25, 1955 |
| 2,749,825 | Hirasuna | June 12, 1956 |